(12) United States Patent
Mossal et al.

(10) Patent No.: US 6,352,951 B1
(45) Date of Patent: Mar. 5, 2002

(54) REFRACTORY MATERIAL BASED ON CHROMIUM CORUNDUM, A CHROMIUM CORUNDUM BRICK AND THE USE OF SAID BRICK

(75) Inventors: Karl-Heinz Mossal, Idstein; Selim Yesiltas, Oestrich-Winkel; Albert Kleinevoss, Hoehr-Grenzhausen; Thomas Weichert, Bad Schwalbach, all of (DE)

(73) Assignee: Didier-Werke AG (DE)

( * ) Notice: Subject to any disclaimer, the term of this patent is extended or adjusted under 35 U.S.C. 154(b) by 0 days.

(21) Appl. No.: 09/462,052

(22) PCT Filed: Jun. 10, 1998

(86) PCT No.: PCT/EP98/03513

§ 371 Date: Mar. 13, 2000

§ 102(e) Date: Mar. 13, 2000

(87) PCT Pub. No.: WO99/01399

PCT Pub. Date: Jan. 14, 1999

(30) Foreign Application Priority Data

Jul. 1, 1997 (DE) .......................................... 197 27 917

(51) Int. Cl.$^7$ ..................... C04B 35/105; C04B 35/106
(52) U.S. Cl. ....................... 501/105; 501/128; 501/132; 501/107
(58) Field of Search .................................. 501/105, 107, 501/127, 128, 132

(56) References Cited

U.S. PATENT DOCUMENTS

| | | | | |
|---|---|---|---|---|
| 3,192,058 A | * | 6/1965 | Davies et al. | |
| 3,948,670 A | * | 4/1976 | Manigault | 501/127 |
| 4,236,931 A | * | 12/1980 | Kiehl et al. | 501/124 |
| 4,290,814 A | * | 9/1981 | Pavlica et al. | 501/107 |
| 4,308,067 A | * | 12/1981 | Guigonis et al. | 501/115 |
| 4,792,538 A | | 12/1988 | Pavlica et al. | |
| 5,362,692 A | * | 11/1994 | Bugajski et al. | 501/103 |

FOREIGN PATENT DOCUMENTS

| | | |
|---|---|---|
| EP | 0 242 769 | 10/1987 |
| GB | 2 098 198 | 11/1982 |
| JP | 08-048574 | * 2/1996 |
| JP | 09-052168 | * 2/1997 |

OTHER PUBLICATIONS

Perry et al., Perry's Chemical Engineering Handbook, p. 19–20, 1997.*

Schulle, "Feuerfeste Werkstoffe", 1$^{st}$ edition, 1990 (No Month) (ISBN 3–342–00306–5), pp. 228, 289.

* cited by examiner

*Primary Examiner*—David R. Sample

(57) ABSTRACT

The invention concerns a refractory material based on chromium corundum, a chromium corundum brick made of said material as well as the use thereof.

13 Claims, No Drawings

REFRACTORY MATERIAL BASED ON CHROMIUM CORUNDUM, A CHROMIUM CORUNDUM BRICK AND THE USE OF SAID BRICK

The invention concerns a refractory material based on chromium corundum, a chromium corundum brick made of said material as well as the use thereof.

Refractory materials based on chromium corundum comprising about 10% by wt. $Cr_2O_3$ and about 90% by wt. $Al_2O_3$ are known from Schulle, "Feuerfeste Werkstoffe", 1st edition, 1990 (ISBN 3-342-00306-5), pages 288, 289. There, refractory materials based on $Cr_2O_3/ZrO_2$ are mentioned as well. At the same place it is indicated that the use of such materials as refractory ceramics is little known.

In EP 0 242 769 A2, a dense ceramic brick is described, which may consist of 10 to 90% by wt. of $Al_2O_3$, 90 to 10% by wt. of $Cr_2O_3$ and 0 to 40% by wt. of $ZrO_2$, wherein the brick shall have a density of at least 92% of its theoretical density. Accordingly, the said oxides are used only in fine grain fractions (<50 $\mu$m). Such bricks are used in glass-melting furnaces, among other things.

Because of their high density, the known bricks are relatively brittle and show an unsatisfactory corrosion behavior, in particular at increased application temperatures (above 1,500° C.).

Therefore, they cannot be applied, for example, in rotary kilns, as used in incinerating refuse, particularly in incinerating hazardous waste.

Thus, the object of the invention is to provide a refractory material and an associated brick, which are applicable in slag-carrying furnaces with high thermal cycling and high temperatures of operation (up to 1,650° C.). Also, a structural elasticity as high as possible is to be obtained.

The invention has understood that materials based on chromium corundum can meet those requirements. For that, it is necessary to adapt the amounts of chromium oxide and corundum as well as the particle size of the selected raw materials.

In its most general embodiment, the invention accordingly concerns a refractory material based on chromium corundum, comprising:

- 5 to 35% by wt., preferably 10 to 30% by wt. of $Cr_2O_3$ having a particle size <0.1 mm,
- 1 to 10% by wt., preferably 3 to 6% by wt. zirconia having a particle size between 0.5 and 4.0 mm,
- 55 to 94% by wt., preferably 62 to 87% by wt. alumina (corundum:) having a particle size between 0.2 and 4.0 mm.

Such a material based on chromium corundum can be manufactured to bricks having a high structural elasticity, which are suitable for the ranges of application mentioned above, for example rotary kilns for incinerating hazardous waste at temperatures of operation up to 1,700° C.

The chromium oxide portion should have a particle size as fine as possible, therefore, according to an embodiment, a particle size of <0.05 mm (<50 $\mu$m) is proposed.

The portion of zirconia may substantially consist of baddeleyite, wherein corresponding medium-grained to coarse-grained raw materials of baddeleyite may be used as baddeleyite support, for example sintered zirconium mullite, fused zirconium mullite, sintered zirconium corundum and fused zirconium corundum, alone or in mixture.

The content of $ZrO_2$ affects substantially the structural elasticity and thus the temperature cycle resistance.

As far as raw materials containing corundum are used for the zirconia portion, the corresponding corundum portion is to be counted in the corundum component mentioned above (55 to 94% by wt. of the total mixture).

According to an embodiment, the refractory material may have an $SiO_2$ portion of <3% by wt. For example, mullite may be used as a raw material for said $SiO_2$ portion.

As far as the zirconium mullite mentioned above is used as a $ZrO_2$ raw material, here too the portion of mullite may be counted, proportionally, if necessary, in the $SiO_2$ component.

For example, the corundum matrix consists of sintered corundum, fused corundum or mixtures thereof.

The said refractory material may be manufactured to bricks. The bricks may be pressed or stamped. They are fired at temperatures between 1,450 and 1,700° C.

The specific particle structure of the individual material components as well as the addition of $ZrO_2$ (baddeleyite) are substantially responsible for the high temperature cycle resistance and the low modulus of elasticity of such a brick.

By a corresponding selection of the raw materials as well as a coordination of the constituent amounts of $Cr_2O_3$, $ZrO_2$ and $Al_2O_3$ and optionally $SiO_2$ and $Fe_2O_3$ (the portion of $Fe_2O_3$ should be <0.5% by wt.) as well as the maintenance of the particle sizes mentioned above for the individual material components a chromium corundum brick may be produced after firing at 1.450 to 1.700° C., which has an open porosity between 9 and 18% by vol. and a modulus of elasticity <30,000 N/mm$^2$.

Here, the modulus of elasticity may be reduced to values up to 15,000 N/mm$^2$ by correspondingly adapting the parameters mentioned above.

The temperature cycling stress (measured according to DIN EN 993, part 11) leads to a value >30.

The corrosion resistance of said bricks is well.

The chromium corundum brick as described above can be used to advantage in rotary kilns for incinerating refuse, in particular for incinerating hazardous waste. It is resistant up to temperatures of 1,700° C. without loosing its high structural elasticity and its excellent corrosion behavior.

Further characteristics of the invention follow from the features of the subclaims as well as the other application documents.

The invention will be explained in more detail below with several embodiments.

A reference sample according to the prior art was selected as batch no. 1. Batch no. 1 consists of 82% by wt. of corundum of a particle size of 0.2 to 3 mm, 8% by wt. of calcined alumina of same particle size, and 10% by wt. of chrome oxide green.

Batch no. 2 according to the invention consists of 70% by wt. of corundum of a particle size of 0.2 to 3 mm, 10% by wt. of calcined alumina of the same particle size, 10% by wt. of zirconium mullite of a particle size of 1.6 to 3.2 mm, and 10% by wt. of chrome oxide green <45 $\mu$m.

Batch no. 3 according to the invention consists of 70% by wt. of corundum of a particle size of 0.2 to 3 mm, 10% by wt. of calcined alumina of the same particle size, 10% by wt. baddeleyite ($ZrO_2$) of a particle size of 0.5 to 2.5 mm and 10% by wt. of chrome oxide green <45 $\mu$m.

By addition of small amounts of water (about 1.0% by wt. based on the mixture of solids) the bricks were pressed and fired in each case at 1,510° C. (within the temperature range of 1,450–1,600° C.)

The open porosity of the bricks for the reference sample 1 was: 15.4% by vol., for sample no. 2: 17.6% by vol., and for sample no. 3: 16.3% by vol.

The cold compressive strength was determined as 313 N/mm$^2$ for sample no. 1, 98 N/mm$^2$ for sample no. 2, and 166 N/mm$^2$ for sample no. 3.

The modulus of elasticity was 79,900 N/mm² for the reference brick no. 1, and 22,356 and 28,200 N/mm respectively for bricks 2 and 3 according to the invention.

The temperature cycle resistance (thermal cycling) determined according to DIN EN 993, part 11, with respect to water was 4 cycles for the reference brick no. 1, 32 cycles for batch no. 2 and 31 cycles for batch no. 3.

Particularly in comparison with the reference sample no. 1, the above mentioned experimental results show a remarkable superiority of the bricks according to the invention with respect to the modulus of elasticity which could be reduced by about 63 to 73%. At the same time, the temperature cycle resistance was increased by a factor >7.

What is claimed is:

1. A refractory material based on chromium corundum, comprising:

5 to 35% by wt. of $Cr_2O_3$ having a particle size of <0.1 mm;

1 to 10% by wt. of zirconia having a particle size between 0.5 and 4.0 mm; and 62 to 94% by wt. of alumina having a particle size between 0.2 and 4.0 mm.

2. The refractory material according to claim 1 comprising an $SiO_2$ portion of <3.0% by wt.

3. The refractory material according to claim 1 comprising an $Fe_2O_3$ portion of <0.5% by wt.

4. The refractory material according to claim 1, wherein the $Cr_2O_3$ has a particles size of <0.05 mm.

5. The refractory material according to claim 1, wherein the $ZrO_2$ portion is formed by a raw material containing baddeleyite.

6. The refractory material according to claim 1, wherein the $ZrO_2$ portion is formed by sintered zirconium mullite, fused zirconium mullite, sintered zirconium corundum, fused zirconium corundum or a ZAC material, individual or in mixture.

7. The refractory material according to claim 1, wherein the $ZrO_2$ portion has a particle size between 1.5 and 3.0 mm.

8. The refractory material according to claim 2, wherein the $SiO_2$ portion is formed by a raw material containing mullite.

9. A chromium corundum brick of a refractory material according to any of claims 1 to 8, wherein a constituent amount of $Cr_2O_3$, $ZrO_2$, $Al_2O_3$, $SiO_2$, and $Fe_2O_3$ are adapted in such a way that the brick fired at 1,450 to 1,700° C. has an open porosity between 9 and 18% by vol. and a modulus of elasticity of <30,000 N/mm².

10. The refractory material according to claim 1, comprising $Cr_2O_3$ in an amount of 10 to 30% by wt.

11. The refractory material according to claim 1, comprising zirconia in an amount of 3 to 6% by wt.

12. The refractory material according to claim 1, comprising alumina in an amount of 62 to 87% by wt.

13. A process for applying chromium corundum bricks in a rotary kiln for incinerating refuse, comprising the steps of:

manufacturing a refractory material comprising 5 to 35% by wt. $Cr_2O_3$ having a particle size <0.1 mm, 1 to 10% by wt. zirconia having a particle size between 0.5 mm and 4.0 mm, and 62 to 94% by wt. alumina having a particle size between 0.2 and 4.0 mm;

applying said refractory material to said bricks by pressing or stamping;

firing said bricks between 1450 and 1700° C.; and applying said bricks in said kiln.

* * * * *